(12) United States Patent
Khanduri et al.

(10) Patent No.: US 8,811,602 B2
(45) Date of Patent: Aug. 19, 2014

(54) FULL DUPLEX SPEAKERPHONE DESIGN USING ACOUSTICALLY COMPENSATED SPEAKER DISTORTION

(75) Inventors: Prakash Khanduri, Freehold, NJ (US); Nelson Sollenberger, Farmingdale, NJ (US); Huaiyu Zeng, Red Bank, NJ (US)

(73) Assignee: Broadcom Corporation, Irvine, CA (US)

( * ) Notice: Subject to any disclaimer, the term of this patent is extended or adjusted under 35 U.S.C. 154(b) by 266 days.

(21) Appl. No.: 13/174,148

(22) Filed: Jun. 30, 2011

(65) Prior Publication Data

US 2013/0003960 A1 Jan. 3, 2013

(51) Int. Cl.
*H04M 9/08* (2006.01)
*H04B 3/20* (2006.01)

(52) U.S. Cl.
USPC .................................... 379/406.06; 381/66

(58) Field of Classification Search
None
See application file for complete search history.

(56) References Cited

U.S. PATENT DOCUMENTS

| | | | |
|---|---|---|---|
| 6,418,228 B1 * | 7/2002 | Terai et al. | 381/71.8 |
| 2006/0147063 A1 * | 7/2006 | Chen | 381/119 |
| 2006/0188089 A1 * | 8/2006 | Diethorn et al. | 379/406.01 |
| 2009/0041263 A1 * | 2/2009 | Hoshuyama | 381/94.1 |
| 2009/0274315 A1 * | 11/2009 | Carnes et al. | 381/66 |

* cited by examiner

*Primary Examiner* — Fan Tsang
*Assistant Examiner* — Jeffrey Lytle
(74) *Attorney, Agent, or Firm* — Sterne, Kessler, Goldstein & Fox P.L.L.C.

(57) ABSTRACT

A telecommunication system including a fall duplex speakerphone, comprising a first microphone to generate a coupled signal including uplink information and non-linear distortion sensed by the first microphone in a speaker phone mode, a second microphone to generate a reference signal including downlink information and the non-linear distortion sensed by the second microphone in the speaker phone mode, and an acoustic echo canceller (AEC) to receive the coupled signal from the first microphone, to receive the reference signal from the second microphone, and to cancel out the non-linear distortion included in the coupled signal based on the non-linear distortion included in the reference signal.

21 Claims, 5 Drawing Sheets

FULL DUPLEX SPEAKERPHONE DESIGN USING ACOUSTICALLY COMPENSATED SPEAKER DISTORTION

BACKGROUND OF THE INVENTION

1. Field of the Invention

This application relates generally to the design of a full duplex speakerphone to be used in telecommunication systems (TSs) including stationary applications (e.g., conference speaker phones) and mobile applications (e.g., cellular phones, handset phones and handheld PDAs).

2. Background Art

Telecommunication systems are capable of operating in a speaker mode in which data is broadcast through the speakers, or in a handset mode in which data is output through an ear piece in the telecommunication system. Audio quality in telecommunication systems, especially in the speaker mode, is a feature that receives high consideration. A known issue affecting audio quality in the speaker mode is the non-linear distortion and echo propagating between the broadcasting speakers and microphones which are co-located on the telecommunication systems. As such, suppression of this non-linear distortion and echo is desired.

Generally, linear filters are used to cancel linear echo. However, linear filters cannot model non-linear distortion, and therefore are not effective in eliminating non-linear distortion. As a result, non-linear processing is used, which reduces voice conversation quality.

Further, complex second and third-order non-linear filters (e.g., Volterra filters) are known to better identify the non-linearities and achieve improved suppression of the same. However, implementation of the non-linear filters is computationally complex and expensive due to the large number of coefficients required to represent the non-linear filters. In addition, the equations required to update these non-linear filters are convoluted, requiring an enormous amount of processing. As such, the use of non-linear filters for suppression of non-linear distortion and echo is complex, expensive, and impractical.

Designing a full duplex speakerphone can also be difficult due to the complicated tuning of telecommunication systems, which can require customized audio tuning on a product-by-product basis. Finally, full duplex speakerphones are difficult to provide for telecommunication systems using conventional DSP techniques, especially for mobile applications where size and cost are the limiting factors. Thus, these limitations are primarily due to poor acoustic designs, inefficient components, and because these conventional techniques cannot account for non-linear distortion in the echo path.

What is needed is an improved configuration for a full duplex speaker phone.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As discussed above and explained in further detail below, conventional telecommunication systems are unable to accurately model and cancel out the non-linear distortion.

Figure 1:
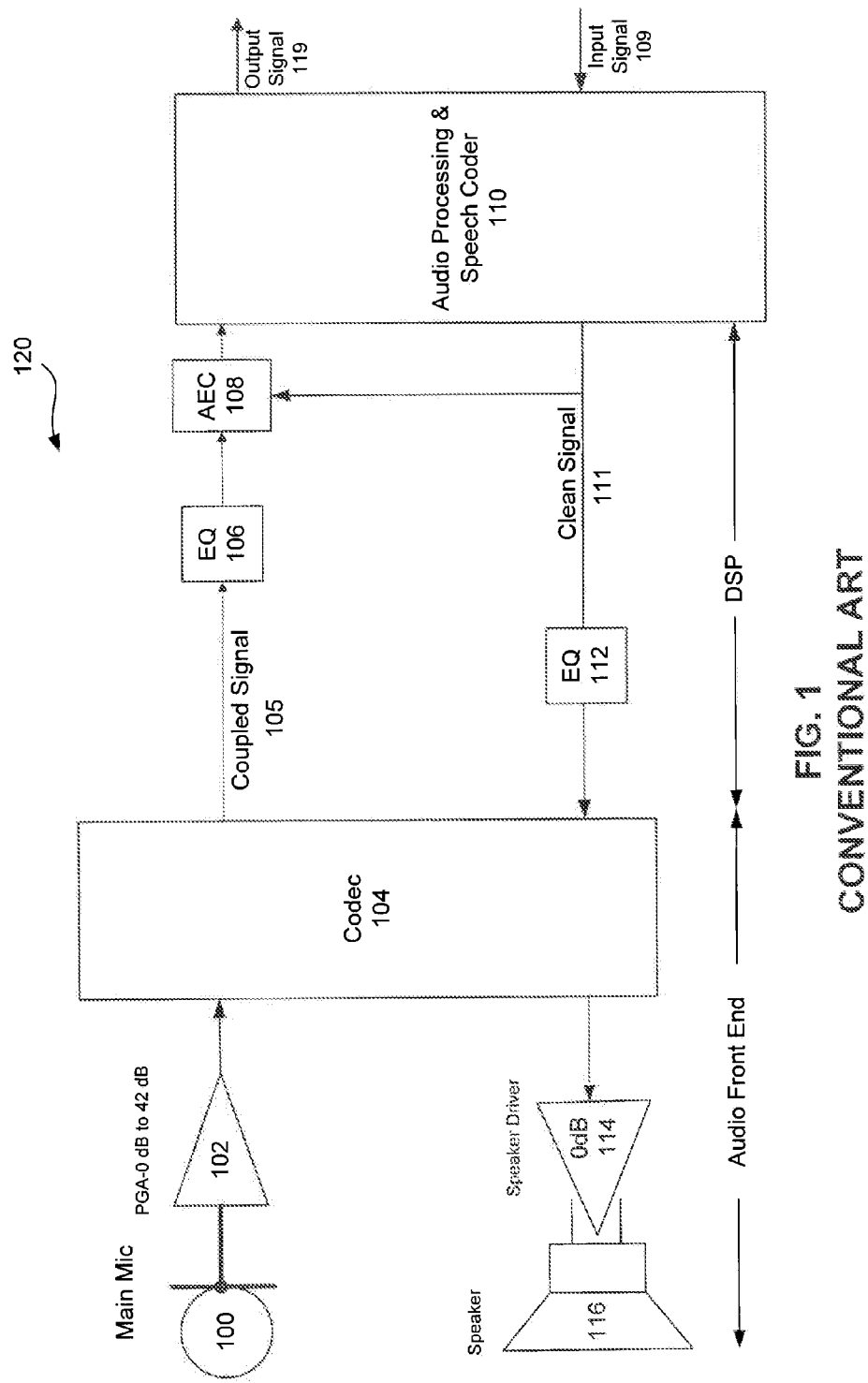
FIG. 1 illustrates a block diagram of a conventional architecture in speaker phone mode using acoustic echo cancellation (AEC).

FIG. 1 illustrates a conventional full duplex telecommunications system 120 operating in speaker mode. For speech broadcast, the conventional full duplex telecommunications system 120 receives an input signal 109, including audio content, from a communications link (e.g. phone line, or mobile) that is to be broadcast through the speakers 116. Based on the input signal 109, Audio Processing and Speech Coder (Speech Coder) 110 generates a clean signal 111 including the audio content to be broadcast. The clean signal 111 is substantially devoid of any distortion or noise from subsequent processing or the local environment. This is because the Speech Coder 110 generates the clean signal 111 without any prior knowledge of non-linear distortion that is generated by driver amplifier 114 and/or the speakers 116. The clean signal 111 is further processed by equalizer 112 and codec 104 before being provided to speaker driver 114, which drives the speaker 116 to broadcast the audio content included in the clean signal 111.

For signal/speech reception, system 120 includes a microphone 100, programmable gain amplifier 102, codec 104, equalizer 106, active echo canceller 108, and the Audio Processing and Speech Coder 110. Specifically during speech reception, main microphone 100 captures an input audio signal (e.g. speech) that is amplified by programmable gain amplifier (PGA) 102, and then processed by codec 104 to produce a coupled signal 105 that is equalized by equalizer 106. The output of equalizer 106 is provided to the acoustic echo canceller (AEC) 108 in addition to the clean signal 111 that represents any co-existing broadcast from speaker 116. The output of the acoustic echo canceller (AEC) 108 is provided to the Speech Coder 110, which then produces an output signal 119 to be provided to the communications link (e.g. phone line, or mobile).

Some measure of any broadcast output from speaker 116 will be undesirably picked-up by the main microphone 100. However, since the clean signal 111 is known, then the AEC 108 can cancel the clean signal 111 content from coupled signal 105, to at least partially mitigate this effect.

However, in the speaker phone mode (as opposed to the handset mode), the speakers 116 of a conventional telecommunication system, shown in FIG. 1, can be over-driven by speaker driver 114 forcing the speakers 116 to enter and operate in their saturation regions, which is turn leads to the generation of non-linear harmonics and distortion. This non-linear distortion is picked up or sensed by the main microphone 100 of the telecommunication system along with desired audio and background noise, and is therefore included in the coupled signal 105.

The AEC 108 attempts to model and cancel-out the non-linear distortion included in the coupled signal 105 based on the clean signal 111 received from the Speech Coder 110. However, the speech coder 110 generates the clean signal 111 based on input signal 109 by running conventional algorithms which do not account for the non-linear distortion included in the coupled signal 105. That is, the speech coder 110 generates the clean signal 111 without any prior knowledge of the non-linear distortion, occurring due to the over-driven speakers, included in the coupled signal. As such, the clean signal 111 cannot enable the AEC 108 to identify the non-linearities which are responsible for the non-linear distortion. Therefore, the AEC 108 is not able to accurately model and cancel out the non-linear distortion. Therefore, the AEC 108 attempts to use non-linear processing to model the distortion, which produces poor audio performance in speaker phone mode of the conventional telecommunication system.

Figure 2:
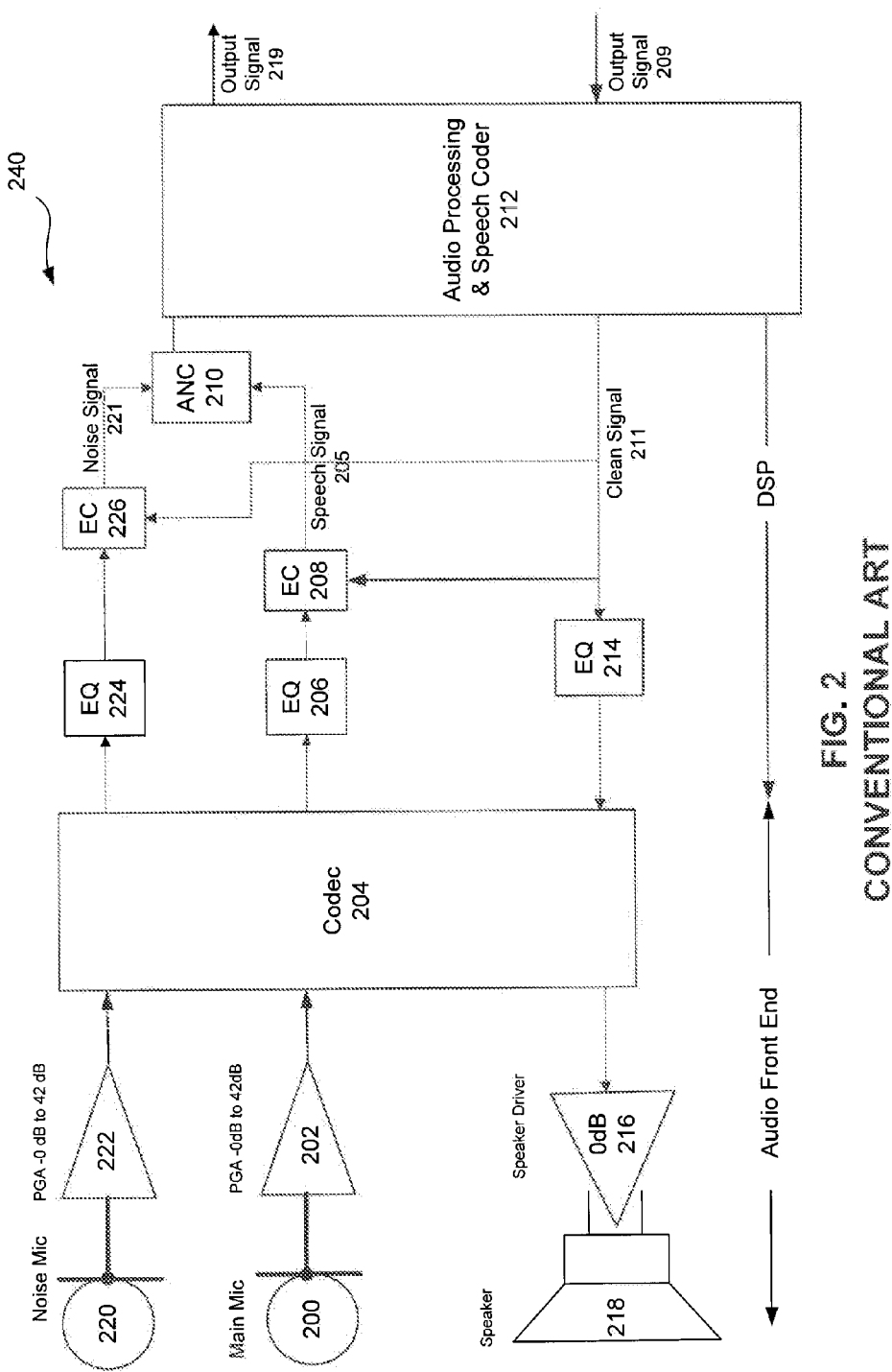
FIG. 2 illustrates a block diagram of a conventional architecture in handset (non-speaker) mode using active noise cancellation (ANC).

FIG. 2 illustrates a conventional telecommunication system 240 operating in the handset mode using two microphones (main microphone 200, noise microphone 220). In this conventional telecommunication system 240, neither of the two microphones 200, 220 are acoustically coupled to the speakers 218. Further, the speakers of a telecommunication system operating in the handset mode are generally not over-driven, and therefore there is no non-linear distortion due to over-driven speakers.

In the conventional telecommunication system 240, the noise microphone 220 is turned off in the speaker phone mode. Specifically, it is not known in the conventional art to acoustically couple an echo reference microphone (ER mic) to the speakers to suppress the non-linear distortion occurring due to the over-driven speakers, as proposed by the present application.

For example, as illustrated in FIG. 2, in the handset mode, a main microphone 200 picks up or senses the uplink information (e.g. desired audio), distortion, and the background noise. This sensed information is amplified by a programmable gain amplifier 202, and then processed by a codec 204 and an equalizer 206. The echo canceller (EC) 208 receives the output of the equalizer 206 in addition to a clean signal 211 from the speech coder 212 to produce a speech signal 205. The echo canceller 208 receives the clean signal 211 from the speech coder 212 to model and cancel the echo included in the output of the equalizer 206. The clean signal 211 is generated by the speech coder 212 based on an input signal 209 received from an external communication link (e.g. phone line, or mobile). The speech signal 205 is then delivered from the echo canceller (EC) 208 to an active noise canceller (ANC) 210.

Also, in the handset mode, a noise microphone 220 picks up or senses background noise from the local environment. This sensed background noise is processed by the codec 204 and an equalizer 224. The echo canceller 226 receives the output of the equalizer (EQ) 224 in addition to the clean signal 211 from the speech coder 212 to produce a noise signal 221. The clean signal 211 allows the echo canceller 226 to model and cancel the echo included in the output of the equalizer 224. The noise signal 221 is then delivered from the echo canceller (EC) 226 to the active noise canceller (ANC) 210.

The Active Noise Canceller (ANC) 210, upon receiving the speech signal 205 and the noise signal 221, cancels/subtracts the unwanted noise included in the noise signal 221 from the speech signal 205, and provides the output to the speech coder 212. The speech coder 212 produces an output signal 219 that is provided to the external communication link.

When the conventional telecommunication system 240 is operated in the speaker phone mode, the noise microphone 220 is turned off. Therefore, in the speaker phone mode, the non-linear distortion picked up or sensed by the main microphone 200 is included in the speech signal 205. The echo canceller 208 attempts to model and cancel out this non-linear distortion included in the speech signal 205 based on the clean signal 211 generated by the speech coder 212. However, the speech coder 212 generates the clean signal 211 by running conventional algorithms which do not account for the non-linear distortion included in the speech signal 205. That is, the speech coder 212 generates the clean signal 211 without any prior knowledge of the non-linear distortion that is produced by overdriving speakers 218, which is ultimately included in the speech signal 205. As such, the clean signal 211 cannot enable the echo canceller 208 to identify the non-linearities which are responsible for the non-linear distortion, and therefore the echo canceller cannot accurately model and cancel out the non-linear distortion included in the speech signal 205.

Further, even if the noise microphone 220 were turned on in the speaker phone mode, the echo canceller 226 would not be able to accurately model and cancel out the non-linear distortion introduced due to the over-driven speakers 218. This is because the noise microphone 220 of the telecommunication system 240 is not acoustically coupled to the speakers 218, and therefore, the noise microphone 220 cannot pick up or sense the non-linear distortion introduced due to the over-driven speakers 218 in the speaker phone mode. As such, when the conventional telecommunication system 240 is operated in the speaker phone mode, the noise signal 221 generated based on the information sensed by the noise microphone 220 cannot be used to suppress the non-linear distortion included in the speech signal 205 due to the over-driven speakers 218.

For at least the above reasons, the conventional telecommunication system 240 shown in FIG. 2 is unable to accurately model and cancel out the non-linear distortion included in the speech signal 205 due to the over-driven speakers 218.

To correct the above problems, a telecommunication system according to embodiments of the present invention is proposed that includes an echo-reference microphone (ER microphone) that is acoustically coupled to the speaker. In an exemplary embodiment, the ER microphone is acoustically coupled to the speaker by placing the ER microphone in a physical acoustical cavity that contains the speaker. As discussed below, by doing so the acoustic echo canceller is now enabled to accurately model and cancel out the non-linear distortion included in the coupled signal due to the over-driven speakers based on an echo reference signal generated by the ER microphone. As such, the ER microphone senses an echo reference signal that includes the distortion, and hence the acoustic echo canceller does not need to model it. Also, the proposed technique will reduce the overall echo tail length of the echo canceller because the echo reference signal and coupled path will treat surround wall reflections as a point source. Hence, echo canceller does not need to model for a longer echo tail, which significantly reduces the processing cost.

Figure 3:
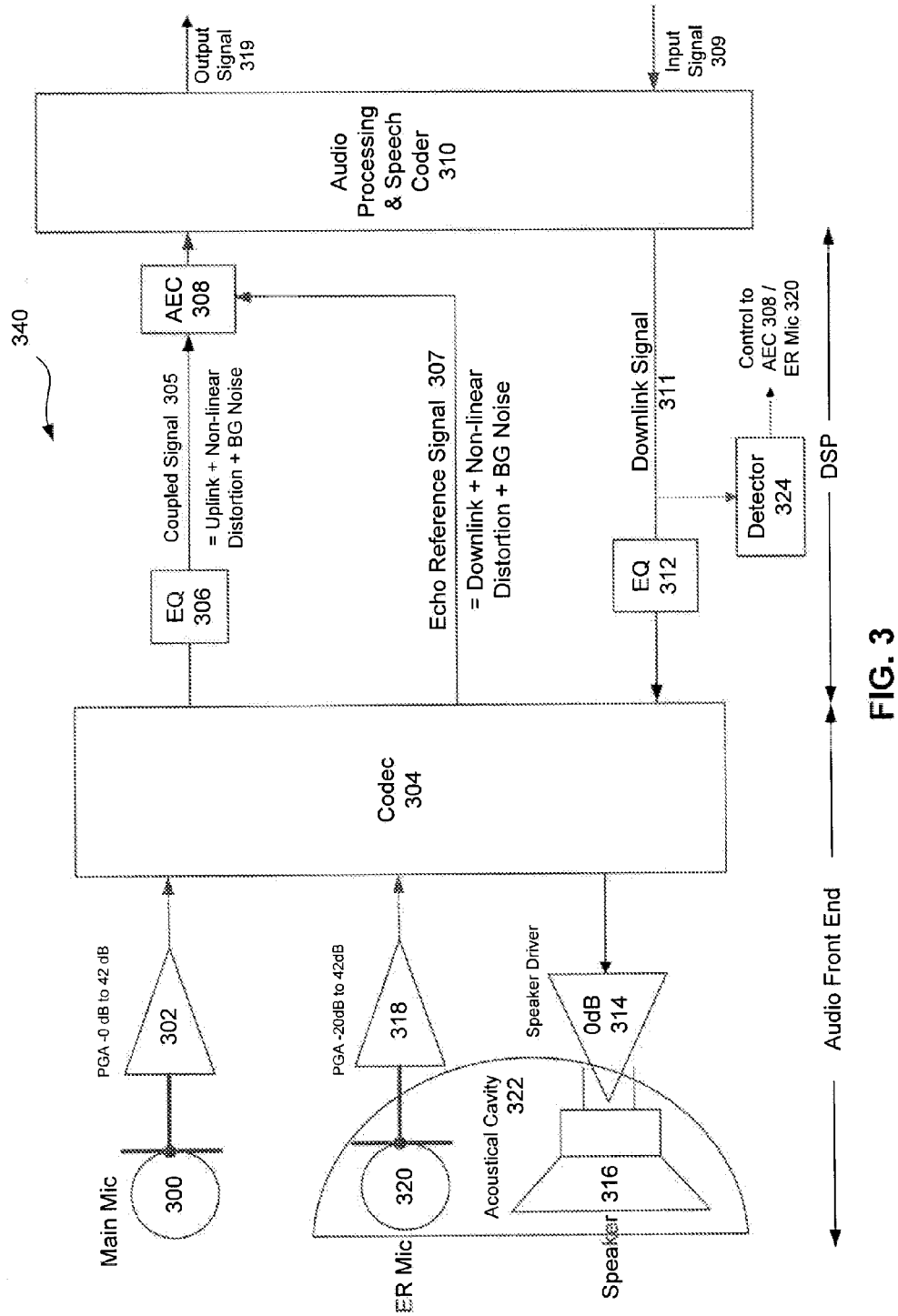
FIG. 3 illustrates a block diagram of an architecture in speaker phone mode using AEC, according to an embodiment of the present invention.

FIG. 3 illustrates a full duplex speakerphone 340 according to embodiments of the invention. When the full duplex speakerphone 340 is operating in the speaker phone mode, the main microphone 300 picks-up or senses the following: uplink signal or information (e.g. desired audio), speaker broadcast audio including the non-linear distortion from the over-driven speakers 316, and background noise. This sensed uplink signal (i.e. sensed information) is amplified by a PGA 302, and then processed by a codec 304 and an equalizer 306 to generate a coupled signal 305. The coupled signal 305 is then supplied to the AEC 308. Herein, uplink information is desired audio to be picked-up by main microphone 300, and downlink information is meant to be broadcast by speaker 316.

During broadcast, the speech coder 310 receives an input signal 309 from the external communication link to generate a downlink signal 311, which includes audio content to be broadcast by the speakers 316. The downlink signal 311 is processed by an equalizer 312 and the codec 304 before being amplified by speaker driver 314 to drive the speakers 316.

Echo Reference (ER) microphone 320 is acoustically coupled to the speaker 316, and therefore the ER microphone 320 picks up or senses the an echo signal that includes the downlink information, any non-linear distortion from the over-driven speakers 316, and any background noise. ER microphone can be acoustically coupled to speaker 316 by placing it in an acoustical cavity 322 that houses both the ER microphone 320 and the speaker 316, as shown in FIG. 3. The ER microphone 320 provides a dual use: in handset mode, it acts as a noise reference microphone; whereas in speakerphone mode, it acts as an echo reference microphone. PGA 318 amplifies the sensed information from the ER microphone 320, the output of which is further processed by the codec 304 to generate an echo-reference signal (ER signal) 307. This ER signal 307 is then provided to the AEC 308. Upon receiving the ER signal 307, the AEC 308 can now accurately model and cancel out the non-linear distortion from the speakers 116 by "subtracting" the non-linear distortion included in the ER signal 307 from the non-linear distortion included in the coupled signal 305. The output of the AEC 308 is then provided to the speech coder 310 to produce an output signal 319 that is provided to an external communication link. The main microphone 300, PGA 302, codec 304, and equalizer 306, or portions thereof, may be considered a "main signal path" or "main path" that produces the coupled signal 305. Likewise, the ER microphone 320, PGA 318, codec 304, or portions thereof, may be considered an "echo signal path" or "echo path" that produces the reference signal 307, where main path and echo path meet at AEC 308 for distortion cancellation.

In an exemplary aspect, before performing the subtraction, the AEC 308 determines that the non-linear distortion included in the ER signal is identical to the non-linear distortion included in the coupled signal.

The subtracting of the non-linear distortion included in the ER signal 307 from the non-linear distortion included in the coupled signal 305 may be done by introducing a delay in at least part of one of the signals, or by manipulating properties of either of the signals, for example, by inverting a phase or an amplitude of either of the signals, or a part thereof, so that one of the signals resembles the other, but is canceled due to the inverting. The mentioned delay is proportional to the path delay within the echo signal path.

In this way, when the telecommunication system 340 operates in the speaker phone mode, the ER signal 307 is generated based on prior knowledge of the non-linear distortion from the over-driven speakers 316. Therefore, the AEC 308 can now accurately model and cancel out the non-linear distortion, which is not possible by simply using the clean signals 111 or 211, as discussed above regarding the conventional telecommunication systems 120, 240 shown in FIGS. 1 and 2.

In a similar way as discussed above regarding accurate cancellation of the non-linear distortion, the AEC 308 can also accurately model and cancel out the background noise included in the coupled signal 305 because the background noise, or a representation thereof, is also included in the ER signal 307, thereby improving the signal-to-noise ratio (SNR) of the coupled signal 305. Without the background noise being provided/fed back via the ER signal 307, the AEC 308 struggles to model and cancel the background noise included in the coupled signal 305 by using conventional processing and without prior knowledge of the background noise, as discussed above with respect to the non-linear distortion.

The AEC 308 supplies the speech coder 310 with the uplink information without the non-linear distortion and with improved SNR. Accordingly, embodiments of the invention provide improved audio quality for full duplex operation in the speaker phone mode compared with the conventional telecommunication systems 120, 240.

With the above inventive architecture, the AEC 308 is not required to conduct additional or excessive processing, and is able to converge faster, because the AEC 308 is not required to attempt to identify and model the non-linear distortion (and/or the background noise) included in the coupled signal 305. Therefore, the processing load on the AEC 308 and the speech coder 310 to model the non-linear distortion (and/or the background noise) is significantly reduced.

In another embodiment of the invention, the processing load within the telecommunication system 340 can be lowered by updating the acoustic echo canceller 308 with the ER signal 307 only when the speech coder 310 actively outputs downlink information. That is, the ER microphone 320 generates the ER signal 307 and/or the AEC 308 attempts to model and cancel out the non-linear distortion only when the speech coder 310 actively outputs downlink information that is to be broadcast by speaker 316. For example, a detector 324 may be included to analyze the downlink signal 311, and provide a control signal to the ER microphone 320 and AEC 308 to indicate when the detector 324 detects a significant level of downlink information in the downlink signal 311. The ER microphone 320 generates the ER signal 307 and/or the AEC 308 runs selective algorithms to cancel out the non-linear distortion (and/or back ground noise) only when properties of the downlink signal 311 are detected to be at or above predetermined and programmable threshold levels. Exemplary properties of the downlink signal 311 that can be analyzed include, but are not limited to, a sound (dB) level and/or amplitude level, or a phase level.

Figure 4:
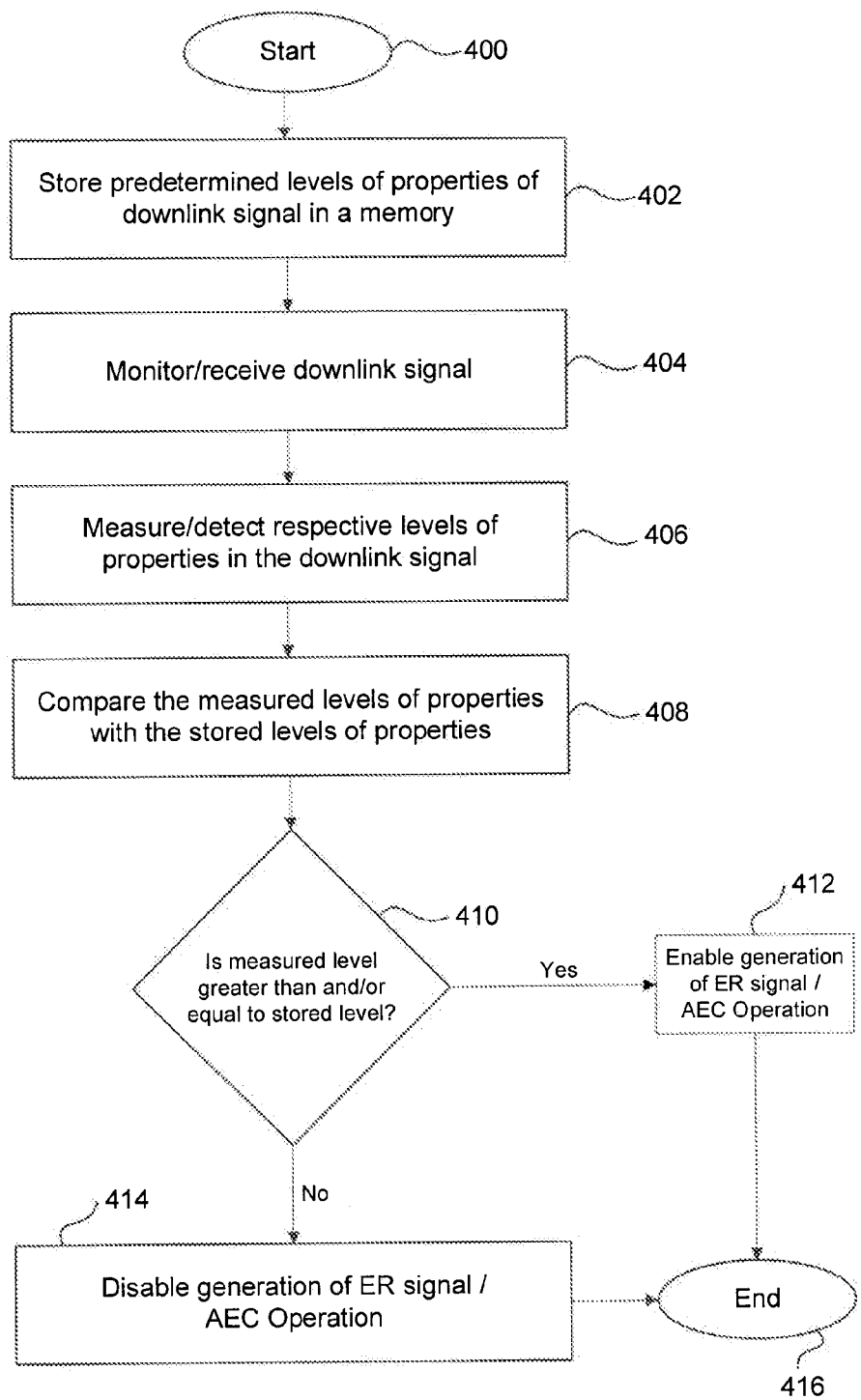
FIG. 4 illustrates an exemplary process of controlling generation of the echo reference (ER) signal according to an embodiment of the present invention.

In an exemplary aspect, the detection of the properties of the downlink signal can be carried out according to the process illustrated in FIG. 4. The process starts at step 400. At step 402, a memory stores one or more programmed predetermined threshold levels of properties (parameters) of the downlink signal 311. At step 404, a detector 324 monitors or receives the downlink signal 311 and, at step 406, the detector 324 measures or detects one or more levels of properties present in the downlink signal 311. At step 408, the detector 324 compares the one or more measured levels of properties in step 406 with respective one or more levels of properties stored in step 402. At step 410, the detector determines whether the one or more level measured in step 408 is greater or equal to (or smaller or equal to) a respective one or more level stored in step 402.

If the result of the determination is YES, then, in step 412, the detector 324 enables the generation of the ER signal 307 through the ER microphone 320 and/or the AEC 308 operation to model and cancel-out the non-linear distortion. However, if the result of the determination in step 410 is NO, then, in step 414, the detector 324 disables the generation of the ER signal 307 through the ER microphone 320 and/or the AEC 308 operation to model and cancel-out the non-linear distortion. The process ends at step 416.

One of ordinary skilled in the art will appreciate that the levels of properties of the downlink signal can be in analog or digital form. Further, some examples of the properties of the levels include a sound (dB), and/or a phase, and/or an amplitude level of the downlink signal 311.

In a further embodiment, the AEC 308 can be configured to run selective algorithms to customly cancel out certain unwanted properties based on acoustics, and/or surroundings, and/or user preferences. For example, the AEC 308 will cancel background noise along with the echo and hence overall quality is improved.

Figure 5:
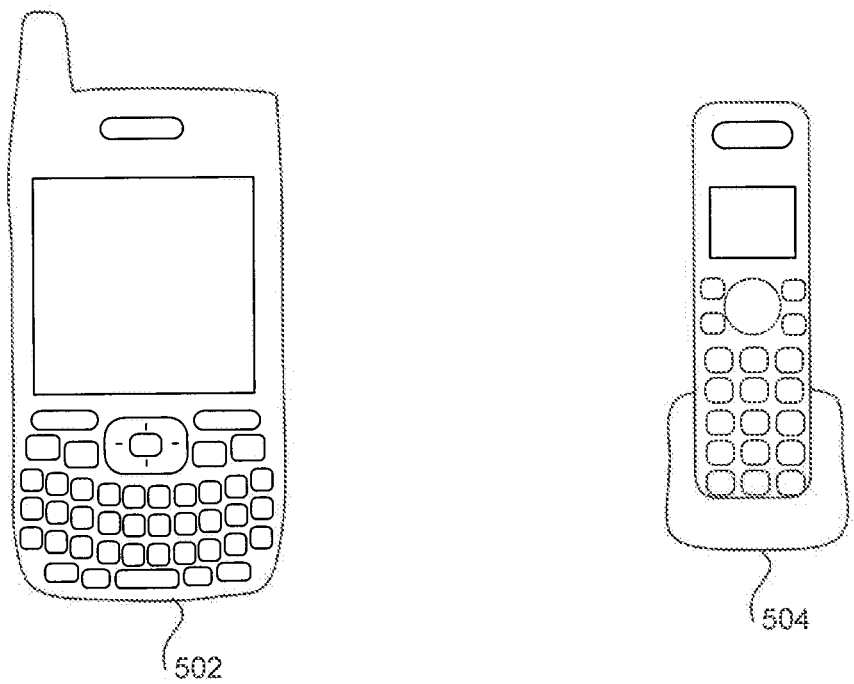
FIG. 5 illustrates exemplary telecommunication systems (TSs) which can utilize the full duplex speakerphone according to embodiments of the present invention.
Figure 5:
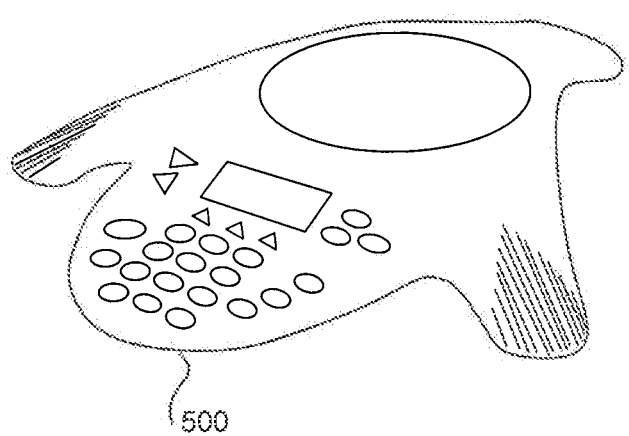

FIG. 5 illustrates some exemplary telecommunication systems 500, 502, 504 which can utilize the full duplex speakerphone according to embodiments of the present invention.

Additional advantages of the above inventive architecture include:

Continued use of conventional AEC algorithms avoiding the effort required to redesign the AEC algorithms.
  The AEC processing time is shortened because the AEC converges faster and models the non-linear distortion and background noise in the echo path rapidly enabling rapid echo cancellation and better full duplex performance.
  Improved SNR performance can be obtained.
  Better full duplex performance can be obtained in spite of poor acoustics.
  Customer satisfaction is improved and unnecessary field trips are reduced.

The following are some guidelines to enhance the performance of the AEC using the ER Signal:

The ER microphone could be placed as close as possible to the IHF (integrated hands-free) loudspeaker port, and there could be approximately up to 20 dB attenuation prior to signal conditioning in IHF mode (with possibly no gain).
  There could also be capability to provide approximately 42 dB gain in the ER microphone path if the ER microphone is used as the main microphone in handset mode.
  Provision could be made to add gain while ER microphone is being used as primary microphone in handset mode.
  The acoustical coupling of the ER microphone 320 to the speakers 316 allows the ER microphone 320 to be configured to pick up or sense the non-linear distortion and echo at a rate of about 10 to 15 dB louder than the main microphone 300. Further, due to the non-linear distortion being louder in the ER microphone 320, when the AEC 308 converges, there is very little effect on the desired uplink speech and background noise which is about equal level on the main microphone 300 and the ER microphone 320. However the AEC 308 processing may be selectively adjusted to model and cancel the background noise.

In an exemplary aspect, the main microphone 300 could be used as the primary microphone in the handset mode and the speaker phone mode, and the ER microphone 320 could be used as the reference microphone in the speaker mode. The ER microphone 320 could be analog or digital.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should be noted that the exemplary process for cancelling out the non-linear distortion described herein can be implemented in hardware, software, or any combination thereof. For instance, the exemplary process for cancelling out the non-linear distortion described herein can be implemented using computer processors, computer logic, application specific circuits (ASICs), digital signal processors (DSP), etc., as will be understood by one of ordinary skill in the arts based on the discussion herein.

Moreover, the exemplary process for cancelling out the non-linear distortion by AEC can be embodied by a computer processor or any one of the hardware devices listed above. The computer program instructions cause the processor to perform the signal processing functions described herein. The computer program instructions (e.g., software) can be stored in a computer useable medium, computer program medium, or any storage medium that can be accessed by a computer or processor. Such media include a memory device such as a computer disk or CD ROM, or the equivalent. Accordingly, any computer storage medium having computer program code that causes a processor to perform the signal processing functions described herein are with the scope and spirit of the present invention.

The breadth and scope of the present invention should not be limited by any of the above-described exemplary embodiments, but should be defined only in accordance with the following claims and their equivalents.

What is claimed is:

1. A telecommunication system including a full duplex speakerphone, comprising:
a main signal path, including a main microphone, configured to sense an uplink signal and an echo signal and generate a coupled signal, the echo signal including non-linear distortion generated by a speaker of the speakerphone;
an echo signal path, including an echo reference microphone, configured to sense the echo signal and generate a reference signal, the reference signal including downlink information and the non-linear distortion; and
an acoustic echo canceller (AEC) configured to receive the coupled signal from the main signal path, to receive the reference signal from the echo signal path, and to cancel out the non-linear distortion included in the coupled signal based on the non-linear distortion included in the reference signal, wherein, to cancel out the non-linear distortion, the AEC is configured to introduce a delay in at least part of the reference signal, the delay being proportional to a path delay associated with the echo signal path.

2. The telecommunication system according to claim 1, wherein the non-linear distortion is sensed by the main microphone and the non-linear distortion is sensed by the echo reference microphone when the telecommunication system operates in a speaker phone mode.

3. The telecommunication system according to claim 1, wherein the echo signal path generates the reference signal based on an acoustic coupling of the echo reference microphone with the speaker.

4. The telecommunication system according to claim 3, wherein the echo reference microphone is acoustically coupled with the speaker by placing the echo reference microphone in an acoustical cavity of the speaker.

5. The telecommunication system according to claim 4, wherein the acoustical cavity of the speaker includes physical boundaries that encompass both the speaker and the echo reference microphone.

6. The telecommunication system according to claim 1, wherein the AEC cancels out the non-linear distortion by subtracting the non-linear distortion included in the reference signal from the non-linear distortion included in the coupled signal.

7. The telecommunication system according to claim 6, wherein the subtracting includes at least one of introducing the delay in at least a part of the reference signal, inverting a phase of the reference signal, and regulating an amplitude of the reference signal.

8. The telecommunication system according to claim 1, further comprising:
a processor configured to provide the downlink information to be broadcast by the speaker in a speaker phone mode, and wherein the echo signal path senses the echo signal when the processor is actively providing the downlink information.

9. The telecommunication system according to claim 1, further comprising:
a processor configured to provide the downlink information to be broadcast by the speaker in a speaker phone mode, wherein the AEC receives the reference signal when the processor is actively providing the downlink information, and cancels out the non-linear distortion included in the coupled signal when a sound level of the downlink information is at or above a predetermined threshold.

10. The telecommunication system according to claim 9, wherein the predetermined threshold is programmable.

11. The telecommunications system of claim 1, wherein the non-linear distortion is related to characteristics of the speaker, including signal drive level of the speaker.

12. A method for canceling out non-linear distortion in a telecommunication system, the method comprising:
generating, using a main microphone, a coupled signal including uplink information and non-linear distortion sensed by the main microphone, the non-linear distortion generated by a speaker of a speakerphone in the telecommunication system;
generating, using an echo reference microphone, a reference signal including downlink information and the non-linear distortion;
receiving, at an acoustic echo canceller (AEC), the coupled signal from the main microphone and the reference signal from the echo reference microphone; and
cancelling out, at the AEC, the non-linear distortion included in the coupled signal based on the non-linear distortion included in the reference signal, the canceling out including introducing a delay in at least part of the reference signal, the delay being proportional to a path delay associated with the echo signal path.

13. The method according to claim 12, wherein the generating the coupled signal and the generating the reference signal are performed in a speaker phone mode.

14. The method according to claim 12, wherein the generating the reference signal is performed based on an acoustic coupling of the echo reference microphone with the speaker.

15. The method according to claim 12, further comprising:
acoustically coupling the echo reference microphone with the speaker by placing the echo reference microphone in an acoustical cavity of the speaker.

16. The method according to claim 15, wherein the acoustical cavity of the speaker includes physical boundaries that encompass both the speaker and the echo reference microphone.

17. The method according to claim 12, wherein the cancelling out the non-linear distortion includes subtracting, in the AEC, the non-linear distortion included in the reference signal from the non-linear distortion included in the coupled signal.

18. The method according to claim 17, wherein the subtracting includes at least one of introducing the delay in at least a part of the reference signal, inverting a phase of the reference signal, and regulating an amplitude of the reference signal.

19. The method according to claim 12, further comprising:
providing, via a processor, downlink information to be broadcast by the speaker in a speaker phone mode, wherein the generating the reference signal includes generating the reference signal when the processor is actively providing the downlink information.

20. The method according to claim 12, further comprising:
providing, via a processor, downlink information to be broadcast by the speaker in a speaker phone mode;
receiving, at the AEC, the reference signal when the processor is actively providing the downlink information;
detecting, via a detector, a sound level of the downlink information; and
canceling out, at the AEC, the non-linear distortion included in the coupled signal when the sound level of the downlink information is at or above a predetermined threshold.

21. The method according to claim 20, wherein the predetermined threshold is programmable.

\* \* \* \* \*